United States Patent
Dambrine et al.

(10) Patent No.: US 9,315,927 B2
(45) Date of Patent: Apr. 19, 2016

(54) METHOD FOR PRODUCING A SOLID PART

(75) Inventors: Bruno Jacques Gérard Dambrine, Le Châtelet-en-Brie (FR); Thierry Godon, Sevran (FR); Alain Robert Yves Perroux, Ris Orangis (FR)

(73) Assignee: SNECMA, Paris (FR)

( * ) Notice: Subject to any disclaimer, the term of this patent is extended or adjusted under 35 U.S.C. 154(b) by 368 days.

(21) Appl. No.: 13/809,706

(22) PCT Filed: Jul. 11, 2011

(86) PCT No.: PCT/FR2011/051647
§ 371 (c)(1),
(2), (4) Date: Jan. 11, 2013

(87) PCT Pub. No.: WO2012/007682
PCT Pub. Date: Jan. 19, 2012

(65) Prior Publication Data
US 2013/0105031 A1    May 2, 2013

(30) Foreign Application Priority Data

Jul. 12, 2010   (FR) ...................................... 10 55685

(51) Int. Cl.
*D03D 1/00*         (2006.01)
*B23P 15/04*        (2006.01)
(Continued)

(52) U.S. Cl.
CPC   *D03D 25/00* (2013.01); *B21K 3/04* (2013.01); *B22F 3/15* (2013.01); *B23K 20/021* (2013.01); *B23P 15/04* (2013.01); *C22C 47/066* (2013.01); *D03D 1/00* (2013.01); *F01D 5/141* (2013.01); *F01D 5/282* (2013.01); *F04D 29/324* (2013.01); *B22F 2998/00* (2013.01); *B29C 65/48* (2013.01); *B29C 65/483* (2013.01); *B29C 65/484* (2013.01); *B29C 66/12461* (2013.01); *B29C 66/12463* (2013.01); *B29C 66/301* (2013.01); *B29C 66/53* (2013.01); *B29C 66/721* (2013.01); *B29C 66/742* (2013.01); *B29L 2031/082* (2013.01); *F05D 2220/325* (2013.01); *F05D 2240/121* (2013.01); *F05D 2240/303* (2013.01); *F05D 2300/614* (2013.01); *F05D 2300/702* (2013.01);
(Continued)

(58) Field of Classification Search
CPC ........ B23P 15/04; B21K 3/04; B23K 20/021; B23K 20/023; F01D 5/141; F01D 5/282; Y10T 29/49336; Y10T 29/49337; Y10T 29/49339; Y10T 29/49341; D03D 1/00
See application file for complete search history.

(56) References Cited

U.S. PATENT DOCUMENTS

| 826,063 A | 7/1906 | Reid |
| 5,013,216 A | 5/1991 | Bailey et al. |

(Continued)

FOREIGN PATENT DOCUMENTS

| EP | 0 159 405 A1 | 10/1985 |
| EP | 1 526 285 A1 | 4/2005 |

(Continued)

*Primary Examiner* — Jermie Cozart
(74) *Attorney, Agent, or Firm* — Pillsbury Winthrop Shaw Pittman LLP (57) ABSTRACT

A method for producing a solid part, including weaving a three-dimensional fibrous structure, the weaving being carried out with metal braids consisting of a plurality of metal strands mutually twisted about the longitudinal axis of the braid; and performing hot isostatic pressing on the fibrous structure causing the agglomeration of the metal braids of the fibrous structure so as to produce a solid part.

11 Claims, 6 Drawing Sheets

(51) Int. Cl.
*D03D 25/00* (2006.01)
*B21K 3/04* (2006.01)
*F01D 5/14* (2006.01)
*B23K 20/02* (2006.01)
*B22F 3/15* (2006.01)
*C22C 47/06* (2006.01)
*F01D 5/28* (2006.01)
*F04D 29/32* (2006.01)
*B29C 65/00* (2006.01)
*B29L 31/08* (2006.01)
*B29C 65/48* (2006.01)

(52) U.S. Cl.
CPC .............. *Y02T50/672* (2013.01); *Y02T 50/673* (2013.01); *Y10T 29/49336* (2015.01)

(56) References Cited

U.S. PATENT DOCUMENTS 7,211,109 B2    5/2007  Thompson
2011/0274555 A1* 11/2011 Iwasaki .................... 416/241 R

FOREIGN PATENT DOCUMENTS

| EP | 1 306 459 B1 | 4/2008 |
| EP | 1 908 919 A1 | 4/2008 |
| EP | 1 576 929 B1 | 6/2008 |
| FR | 2 940 173 | 6/2010 |
| WO | WO 2010/061139 A2 | 6/2010 |

\* cited by examiner

METHOD FOR PRODUCING A SOLID PART

CROSS REFERENCE TO RELATED APPLICATIONS

This application is the U.S. National Stage of PCT/FR2011/051647, filed Jul. 11, 2011, 2011, which in turn claims priority to French Patent Application No, 1055686, filed Jul. 12, 2010 and French Patent Application No. 1055685 filed Jul. 12, 2010, the contents of all applications are incorporated herein by reference in their entireties.

The present invention relates to a method for producing a solid part, such as for example a metal reinforcement for a turbine engine blade.

More particularly, the invention relates to a method for producing a metal reinforcement for the leading edge of a turbine engine blade.

The field of the invention is that of turbine engines and more particularly that of fan blades, made of composite or metal material, of a turbine engine and whereof the leading edge comprises a metal structural reinforcement.

However, the invention is also applicable to producing a metal reinforcement intended to reinforce a leading edge or a trailing edge of any kind of turbine engine, terrestrial or aeronautic, and in particular a turbine engine of a helicopter or an aircraft turbojet engine, but also propellers such as open-propellers.

The invention also applies to the production of solid parts having a complex geometrical shape.

It will be recalled that the leading edge, corresponds to the front part of an aerodynamic profile which faces the air flow and which divides the air flow into a lower-surface air flow and an upper-surface air flow. The trailing edge corresponds to the rear part of an aerodynamic profile where the lower-face and upper-face flows are united.

The turbine engine blades, and in particular the fan blades, undergo considerable mechanical stresses, associated in particular with the rotational speed, and have to comply with strict conditions concerning weight and space requirement. Consequently, use is made of blades made of composite materials which are lighter and which have a better resistance to heat.

It is known to provide the fan blades of a turbine engine, produced in composite materials, with a metal structural reinforcement extending over the whole height of the blades and beyond their leading edge, as mentioned in document EP 1908919. Such a reinforcement permits the composite blades to be protected during an impact of a foreign body on the fan, such as for example a bird, hail or stones.

In particular, the metal structural reinforcement protects the leading edge of the composite blade by preventing risks of delamination, fibre rupture or damage due to fibre/matrix de-cohesion.

Conventionally, a turbine engine blade comprises an aerodynamic surface extending, in a first direction, between a leading edge and a trailing edge and, in a second direction essentially perpendicular to the first direction, between a foot and a head of the blade. The metal structural reinforcement assumes the shape of the leading edge of the aerodynamic surface of the blade and extends in the first direction beyond the leading edge of the aerodynamic surface of the blade assuming the shape of the profile of the lower face and the upper face of the blade and in the second direction between the foot and the head of the blade.

In a known manner, the metal structural reinforcement is a metal part made of titanium produced entirely by milling from a block of material.

However, the metal reinforcement of a leading edge of a blade is a part that is complex to produce, requiring numerous complex reworking and tooling operations involving high production costs.

It is known to produce solid parts, in particular metal reinforcements for a turbine engine blade from a three-dimensional metal fibrous structure produced by weaving metal threads and performing a hot isostatic pressing process in a tool causing the agglomeration of the metal threads of the metal fibrous structure in such a way as to obtain a solid part; this process is described in patent application FR20080058996.

Conventionally, the weaving of the fibrous structure is carried out by weaving a plurality of metal warp threads and weft threads, wherein the diameter of the threads is of the order of several tens of millimeters, typically between 0.05 mm and 0.3 mm.

The weaving of the fibrous structure becomes complex and difficult, and indeed difficult to produce, since it is desired to produce a thicker metal fibrous structure, i.e. with metal threads of larger diameter, typically with a diameter greater than 0.4 mm.

This is because it becomes much more difficult to obtain sufficient deformation of the warp and weft threads to produce the weaving with threads, especially made of titanium, having a diameter greater than 0.4 mm.

The solution for reducing the rigidity of the threads consists in performing a heat treatment on the threads in such a way as to reduce their rigidity. However, this heat treatment under oxygen cannot be applied to threads made of titanium, because it leads to oxidation of the titanium threads and this impairs the quality of the part produced by hot isostatic pressing.

In order to overcome this drawback, a solution consists in carrying out a heat treatment under vacuum, i.e. in the absence of oxygen. This solution makes it possible to eliminate the problems of oxidation of the titanium, but on the other hand leads to difficulties in production and handling, because all the operations have to be carried out under vacuum.

Finally, the use of threads having small diameters (i.e. less than 0.4 mm) requires the production of numerous fibrous structures (of small thickness) by weaving, then superposing them one upon the other in a tool in order to obtain a sufficient thickness for the production of the part by hot compaction. The more solid the part, the greater will be the number of fibrous structures required to produce the part, and this consequently increases the number of operations and consequently the production cost of such a part.

In this context, the invention aims to solve the aforementioned problems by proposing a method of production making it possible to produce solid parts of complex shape with a thickness of several millimeters in a simple and rapid manner, at the same time simplifying the production range and reducing the production costs of such apart.

For this purpose, the invention proposes a method of production of a solid part, said method comprising in sequence:
  a step of weaving a three-dimensional fibrous structure by weaving, said weaving being carried out with metal strands formed by a plurality of metal ends mutually twisted about the longitudinal axis of the strand;
  a step of performing hot isostatic pressing on said fibrous structure causing the agglomeration of the metal strands of said fibrous structure so as to produce a solid part.

Metal strand is understood to mean an assembly of metal ends mutually twisted so as to form a metal cable.

Solid part is understood to mean a monobloc part not comprising a hollow part and without an attached part.

Thanks to the invention, it is possible to produce a solid part of complex shape, such as a reinforcement for a turbine engine blade which is a twisted and arched part, in a simple and rapid manner by weaving a fibrous structure forming a preform of the metal reinforcement and by a process of hot isostatic pressing or compacting (HIP for Hot Isostatic Pressing in English) permitting a part that is compact and without porosity to be obtained by the combination of plastic deformation, plastic flow and diffusion welding.

Thanks to the method according to the invention, the fibrous structure is a flexible structure, easily deformable manually. The fibrous structure can also be deformed plastically manually, for example by bending, which makes it possible to shape the fibrous structure manually in the cold state (i.e. at ambient temperature) when it is put in place in the tool.

The manual cold deformation of the fibrous structure makes it possible to avoid thermal deformation, this being a source of oxidation of titanium ends under oxygen, as well as all the complexity of manipulating and handling the titanium part during thermal deformation under vacuum.

The weaving of the fibrous structure by means of flexible strands also makes it possible to avoid the problems of considerable elastic recovery associated with the rigidity of titanium-based threads having a diameter greater than 0.4 mm.

Thus, the deformation of the flexible fibrous structure is carried out without the use of a bending press, without the need to use cold and/or hot forging with tooling so as to impart a particular angle to the fibrous structure.

This method of production makes it possible to generate the manufacture of complex parts by the production of woven preforms of metal strands with a reduction of costs, in particular by reducing the number of operations required for the production of such a part.

The method of production of a solid part according to the invention can also comprise one or more of the undermentioned features, considered individually or in all technically possible combinations:

said weaving step is carried out with metal strands formed by a plurality of metal ends, wherein the diameter of each end is less than 0.1 mm;
said weaving step is carried out with metal strands having a diameter equal to or greater than 0.5 mm;
said weaving step is carried out with metal strands having a diameter equal to or greater than 1 mm;
said weaving step is carried out with metal strands formed by a plurality of metal ends of titanium or by a plurality of metal ends of different materials;
said weaving step is carried out with metal strands formed by a plurality of metal ends of different diameters;
prior to said hot isostatic pressing step, said method comprises a step for shaping said fibrous structure, said shaping being carried out manually;
said shaping of said fibrous structure is carried out when said fibrous structure is put into place in a tool;
prior to said hot isostatic pressing step, said method comprises a step for cleaning said fibrous structure;
said solid part is a metal reinforcement for the leading edge or trailing edge of the fan blade of a turbine engine.

The subject-matter of the invention is also a fibrous structure formed by weaving metal strands formed by a plurality of metal ends mutually twisted about the longitudinal axis of the strand.

The subject-matter of the invention is also a method of production of a hollow solid part, said method comprising in sequence:

a step of weaving a three-dimensional fibrous structure by weaving metal threads and/or strands;
a step of incorporating at least one temporary insert in said fibrous structure;
a step of performing hot isostatic pressing on the assembly formed by said fibrous structure and by said at least one incorporated temporary insert causing the agglomeration of the metal threads of said fibrous structure around said at least one temporary insert, so as to produce a solid part;
a step of chemical attack of said at least one temporary insert in such a way as to dissolve said insert and to form an internal cavity in said solid part, in such a way as to produce a hollow solid part.

"Temporary insert" is understood to mean an insert which is not intended to be permanent and which is only required for the production of the hollow metal reinforcement of the leading edge. The temporary insert is not therefore present in the metal reinforcement in its final state and under no circumstances participates in the mechanical characteristics of the metal reinforcement.

Thanks to the invention, the hollow solid part is produced in a simple and rapid manner by weaving a fibrous structure forming a preform of the metal reinforcement and by a hot isostatic pressing or compacting process (HIP for Hot Isostatic Pressing in English) permitting a part that is compact and without porosity to be obtained by the combination of plastic deformation, plastic flow and diffusion welding.

The incorporation of a temporary insert in the fibrous structure permits a delimited zone to be created, into which the metal material of the fibrous structure cannot flow during the step of hot isostatic pressing. This insert, produced in a material different from the fibrous structure, is then dissolved by chemical attack in such a way as to create an internal cavity in the solid part and thus to produce a part with reduced weight.

To advantage, the hollow solid part is a hollow metal reinforcement of a leading edge or a trailing edge.

This method of production thus makes it possible to avoid the complex production of the reinforcement by machining out of the solid, of the milling of broaching type, using flat bars requiring a large volume of material to be used and consequently considerable costs on the supply of raw material, and it permits metal reinforcements to be produced easily and in compliance with strict mass and/or geometric requirements.

The method for producing a hollow solid part according to the invention can also comprise one or more of the undermentioned features, considered individually or in all technically possible combinations:

said hollow solid part is a hollow metal reinforcement of the leading edge or trailing edge of a fan blade of a turbine engine or a propeller;
prior to said hot isostatic pressing step, said method comprises a step for putting said assembly into place in a tool;
the placement of said assembly and shaping of said assembly in said tool are carried out simultaneously;
said method comprises a prior step of pre-deformation of the assembly by means of a deformation tool;
prior to said hot isostatic pressing step, said method comprises a step of degreasing said assembly;
said step of chemical attack is carried out by immersion of said solid part, obtained during the hot pressing step, in a bath of a chemical agent;

said step of incorporating said at least one temporary insert is carried out by placing said at least one temporary insert between two independent preforms forming said fibrous structure produced in the weaving step;

said step of incorporating said at least one temporary insert is carried out by winding a monolayer preform, forming said fibrous structure produced in the weaving step, around said temporary insert;

said step of incorporating said at least one temporary insert is carried out by placing said at least one temporary insert into a cavity via a slot previously formed in a monolayer preform forming said fibrous structure during said step of weaving said fibrous structure.

Other features and advantages of the invention will emerge more clearly from the description thereof given below, by way of indication and on no account limiting, making reference to the appended figures, amongst which.

In all the figures, common elements have the same reference numbers unless stated to the contrary.

Figure 1:
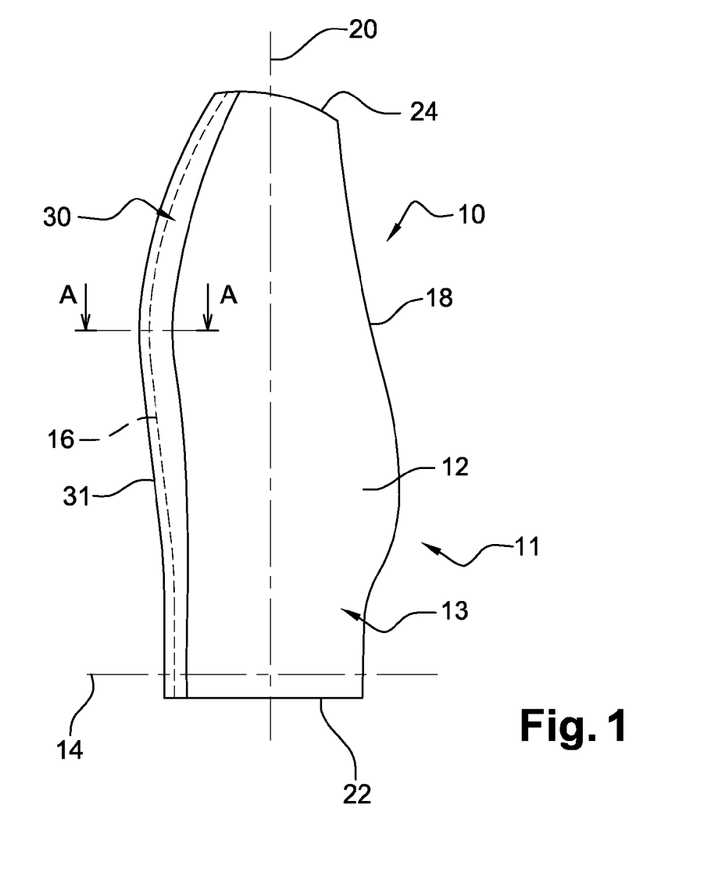
FIG. 1 is a side view of a blade comprising a metal structural reinforcement of the leading edge obtained by means of the method of production according to the invention.

Illustrated blade 10 is for example a mobile fan blade of a turbine engine (not represented).

Blade 10 comprises an aerodynamic surface 12 extending in a first axial direction 14 between a leading edge 16 and a trailing edge 18 and in a second radial direction 20 essentially perpendicular to first direction 14 between a foot 22 and a head 24.

Aerodynamic surface 12 forms an upper surface 13 and a lower surface 11 of blade 10, only upper surface 13 of blade 10 being represented in FIG. 1. Lower surface 11 and upper surface 13 form the lateral faces of blade 10 which connect leading edge 16 to trailing edge 18 of blade 10.

In this embodiment, blade 10 is a composite blade typically obtained by draping or shaping a woven fibrous texture. By way of example, the composite material used can comprise an assembly of woven carbon fibres and a resin matrix, the assembly being formed by moulding by means of a resin injection process of the RTM type (standing for "Resin Transfer Molding").

Blade 10 comprises a metal structural reinforcement 30 glued at its leading edge 16 and which extends both in first direction 14 beyond leading edge 16 of aerodynamic surface 12 of blade 10 and in second direction 20 between foot 22 and head 24 of the blade.

Figure 2:
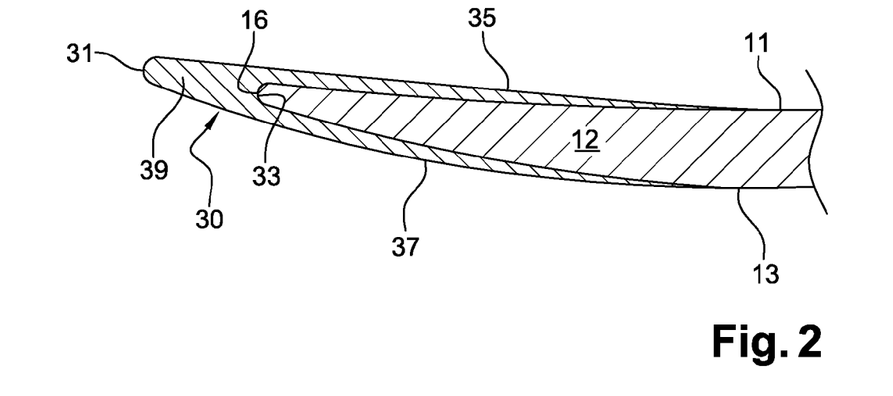
FIG. 2 is a partial cross-sectional view of a first example of embodiment of a blade comprising a metal structural reinforcement of the leading edge obtained by means of the method of production according to the invention, through a plan view of cross-section AA illustrated in FIG. 1.

As represented in FIG. 2, structural reinforcement 30 assumes the shape of leading edge 16 of aerodynamic surface 12 of blade 10 which it extends to form a leading edge 31, so-called leading edge of the reinforcement.

Conventionally, structural reinforcement 30 is a monobloc part having an essentially V-shaped section comprising a base 39 forming leading edge 31 and extended by two lateral sides 35 and 37 respectively assuming the shape of lower surface 11 and upper surface 13 of aerodynamic surface 12 of the blade. Sides 35, 37 have a profile that tapers or thins out in the direction of the trailing edge of the blade.

Base 39 has a rounded internal profile 33 capable of assuming the rounded shape of leading edge 16 of blade 10.

Structural reinforcement 30 is metallic and preferably titanium-based. This material in fact has a great capacity for energy absorption due to impacts. The reinforcement is glued on blade 10 by means of glue known to the person skilled in the art, such as for example a cyanoacrylic glue or epoxy glue.

This type of metal structural reinforcement 30 used for the reinforcement of a composite turbine engine blade is more particularly described in patent application EP 1908919.

The method according to the invention makes it possible to produce in particular a structural reinforcement such as illustrated in FIG. 2, FIG. 2 illustrating reinforcement 30 in its final state.

Figure 3:
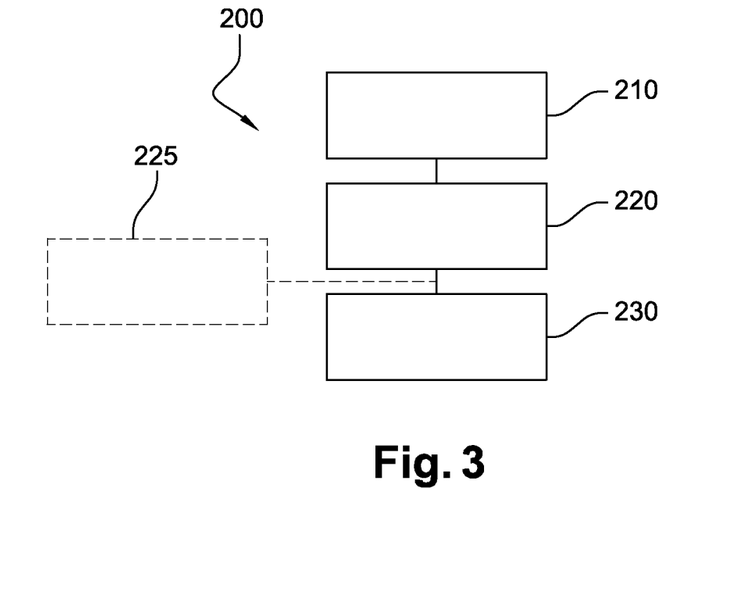
FIG. 3 is a block diagram showing the main steps of a first embodiment of a metal structural reinforcement of the leading edge of a turbine engine blade of the method of production according to the invention.

FIG. 3 represents a block diagram illustrating the main steps of a method of production 200 according to the invention for the production of a metal structural reinforcement 30 of the leading edge of a blade 10 as illustrated in FIGS. 1 and 2.

Figure 4:
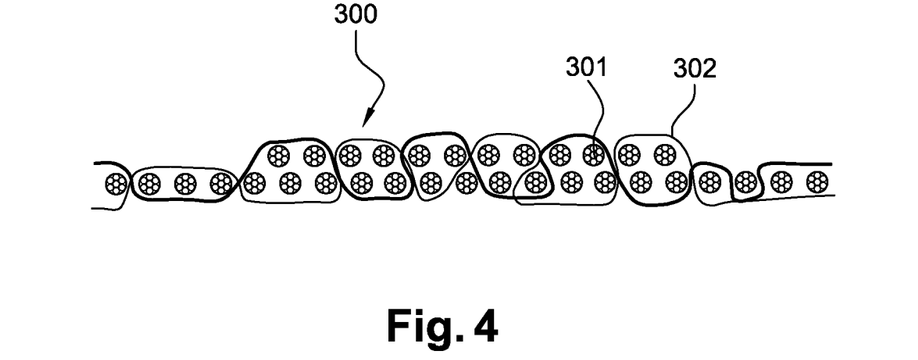
FIG. 4 illustrates a partial cross-sectional view of the metal reinforcement of the leading edge of a turbine engine blade during the first step of the method illustrated in FIG. 3.

First step 210 of method of production 200 is a step of weaving a three-dimensional fibrous structure 300 by weaving metal strands 301, 302, illustrated in FIG. 4.

Weaving step 210 makes it possible to produce one or more three-dimensional metal fibrous structure(s) 300 permitting the final part to be produced.

In this regard, fibrous structure 300 is formed by a plurality of woven strands 301, 302 acting as "warp thread" and "weft thread".

The diameter of metal strands 301, 302 can vary depending on the user's requirements and the material thickness needed to produce the part. The determination of the diameter of the strand is made based on a compromise between flexibility of the fibrous structure and the material thickness required in the tool.

The diameter of strands 301, 302 and the nature of the ends constituting the latter can also vary, in particular between strands suitable for forming warp threads 301 and strands suitable for forming weft threads 302.

Metal strands 301, 302 are formed from a plurality of metal ends twisted, woven or wound into a helix about the longitudinal axis of the strand. To advantage, each metal end forming the strand has a diameter of less than 0.1 mm. The principle of producing the metal strands is advantageously the principle of producing metal cables woven from twisted metal ends.

By way of example, metal strand 301, 302 comprises between 20 and 30 wound ends.

The use of metal strands 301, 302 formed by a plurality of wound metal ends thus makes it possible to produce a flexible strand that is manually deformable in the cold state (i.e. for example at ambient temperature).

By producing metal strands having a diameter greater than 0.5 mm, and even of several millimeters, metal strands 301, 302 remain sufficiently flexible to allow their handling, their manual deformation, and the weaving of a fibrous structure 300 without difficulty.

The weaving patterns of fibrous structure 300 are conventionally weaving patterns used for example in the area of weaving composite fibres, such as for example the weaving patterns described in patent application EP1526285.

The metal ends used to produce strands 301, 302 are mainly titanium-based ends. However, it is possible to incorporate in the weaving ends based on silicon carbide and titanium (SiC—Ti), ends coated with boron (SiC-boron), or with silicon carbide (SiC—SiC).

Figure 5:
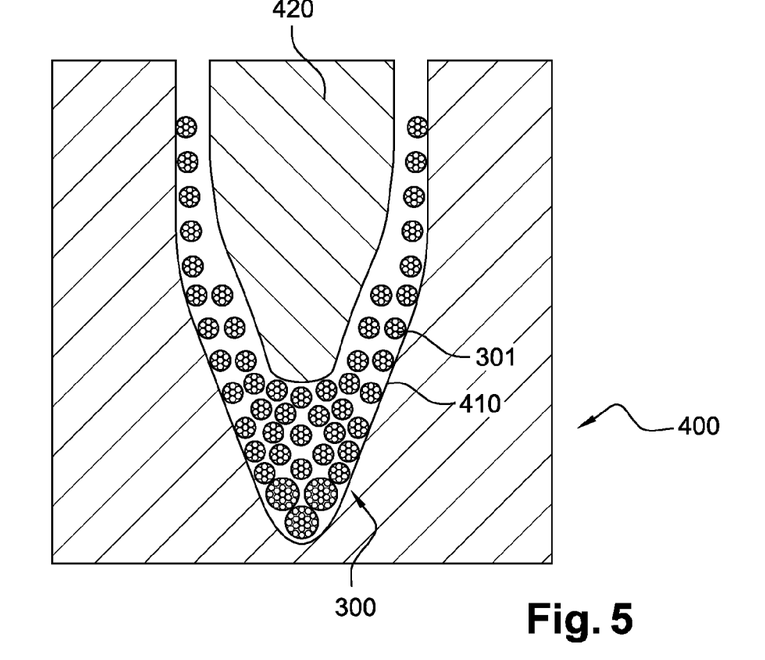
FIG. 5 illustrates a partial cross-sectional view of the metal reinforcement of the leading edge of a turbine engine blade during the second step of the method illustrated in FIG. 3.

Second step 220 of method of production 200, illustrated in FIG. 5, is a step for shaping fibrous structure 300 in a tool 400. To advantage, the shaping of fibrous structure 300 is carried out manually when it is put into place in tool 400.

Tool 400 comprises a mould (bottom die) 410 and a counter-mould (punching die) 420 corresponding to the final shape of the part to be produced.

Fibrous structure 300 produced in the preceding step is a flexible structure that is easily deformable manually. Fibrous structure 300 is also plastically deformable manually, for example by bending, which allows fibrous structure 300 to be shaped manually when it is put into place in the tool.

Figure 6:
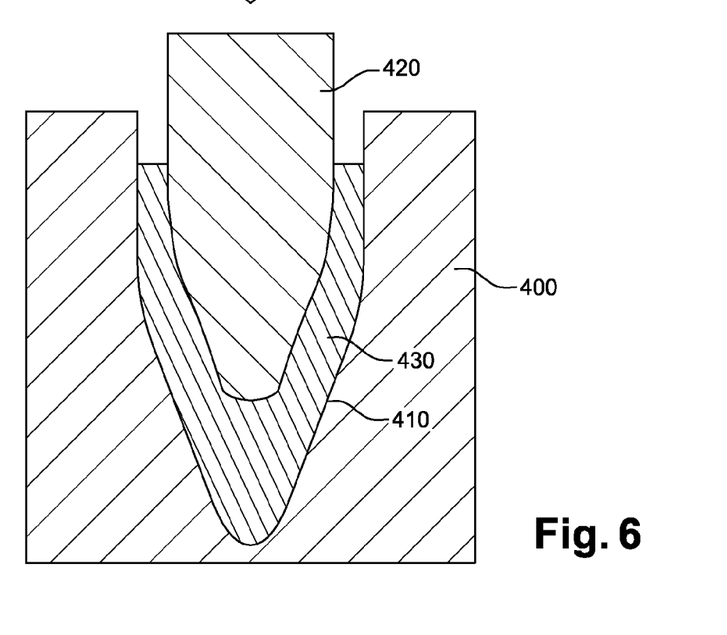
FIG. 6 illustrates a partial view of the metal reinforcement of the leading edge of a turbine engine blade during the third step of the method illustrated in FIG. 3.

Third step 230 of the method of production is a step for performing hot isostatic pressing (HIP for Hot Isostatic Pressing in English) of the fibrous structure in the tool, illustrated in FIG. 6.

Hot isostatic pressing is a very widely used and known production process for reducing the porosity of metals and influencing the density of numerous metals, such as ceramics. The isostatic pressing process also makes it possible to improve the mechanical properties and usability of materials.

The isostatic pressing is carried out at high temperature (conventionally between 400° C. and 1400° C., and of the order of 1000° C. for titanium) and at isostatic pressure.

Thus, the application of the heat combined with the internal pressure eliminates the hollow spaces in fibrous structure 300, as well as the microporosities by means of a combination of plastic deformation, plastic flow and diffusion welding in such a way as to form a solid part 430.

In the case of the production of a metal reinforcement of a turbine engine blade, solid part 430, resulting from the isostatic pressing step, comprises the internal and external profiles of metal reinforcement 30. Solid part 430 is then ejected from tool 400.

The isostatic pressing step is carried out under vacuum, advantageously under secondary vacuum, either in a welded tool in which the secondary vacuum is produced, or in an autoclave bag, the choice of the process depending on the number of parts to be produced. The secondary vacuum makes it possible to avoid the presence of oxygen in the tool and in the fibrous structure during the step of isostatic pressing of the titanium.

The tool is produced in a mechanical alloy, a so-called super-alloy or high-performance alloy.

The isostatic pressing step can include in advance a step 235 for cleaning, degreasing and/or chemical attack of the flexible fibrous structure so as to eliminate residual impurities of the fibrous structure.

To advantage, the step for cleaning out impurities is carried out by immersion of the fibrous assembly in a bath of cleaning agent or chemical agent.

Figure 7:
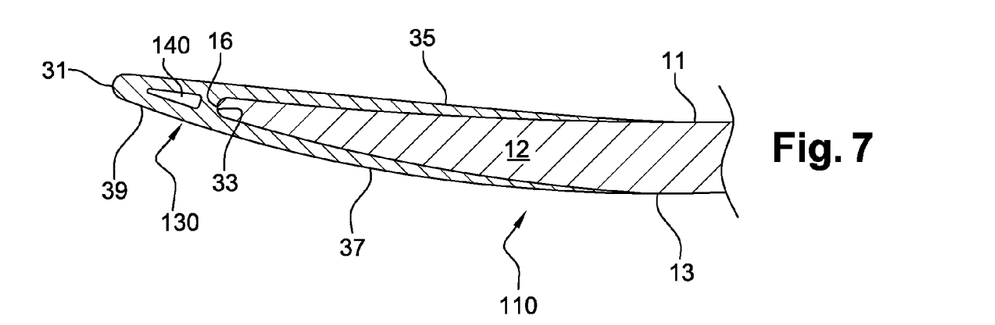
FIG. 7 is a partial cross-sectional view of a second example of embodiment of a blade comprising a metal structural reinforcement of the leading edge obtained by means of the method of production according to the invention, through a plan view of cross-section AA illustrated in FIG. 1.

According to a second example of embodiment of the invention illustrated in FIGS. 7 to 13, the method according to the invention makes it possible to produce a structural reinforcement comprising an internal cavity as illustrated in FIG. 7, FIG. 7 illustrating a second example of embodiment of a reinforcement 130 in its final state.

Figure 8:
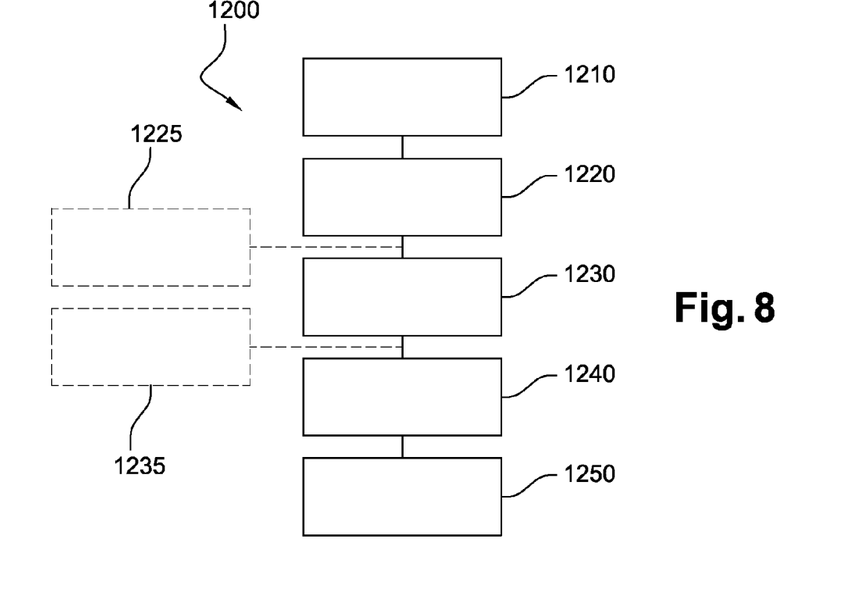
FIG. 8 is a block diagram showing the main steps of a second embodiment of a metal structural reinforcement of the leading edge of a turbine engine blade of the method of production according to the invention.

FIG. 8 represents a block diagram illustrating the main steps of a second embodiment of method of production 1200 of a metal structural reinforcement 130 of the leading edge of a blade 110 such as illustrated in FIG. 7.

Figure 9:
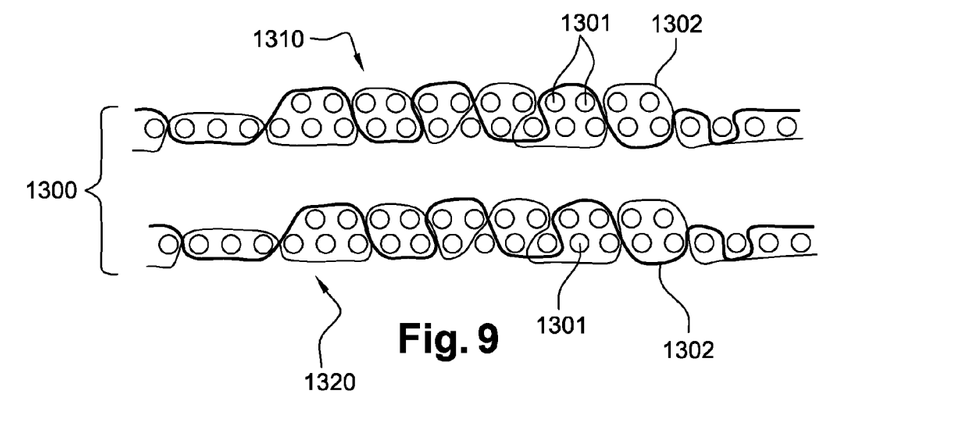
FIG. 9 illustrates a partial cross-sectional view of the hollow metal reinforcement of the leading edge of a turbine engine blade during the first step of the method illustrated in FIG. 8.
Figure 10:
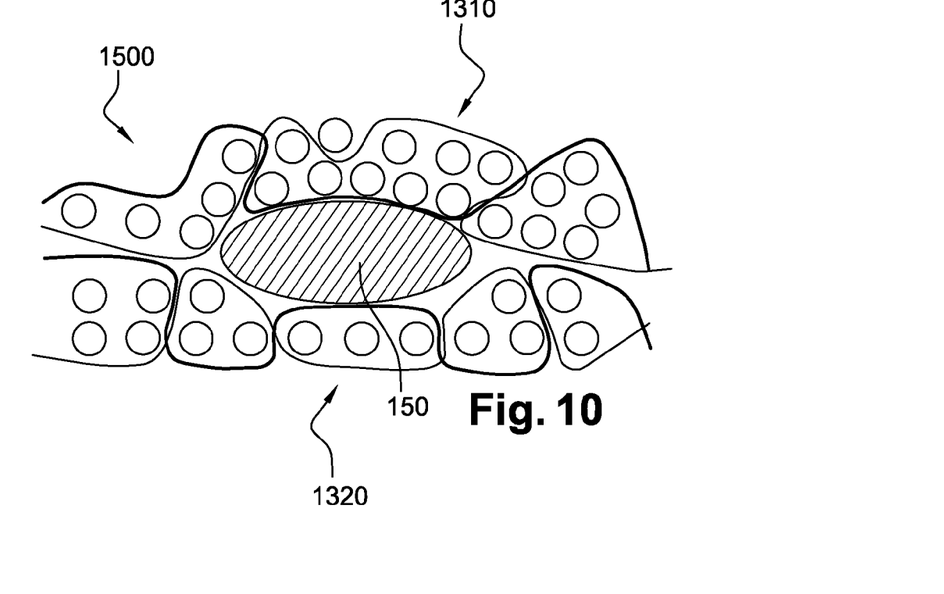
FIG. 10 illustrates a partial cross-sectional view of the hollow metal reinforcement of the leading edge of a turbine engine blade during the second step of the method illustrated in FIG. 8.

First step 1210 of method of production 1200 is a step of weaving a three-dimensional fibrous structure 1300 by weaving metal threads.

This first step 1210 makes it possible to produce at least one preform 1310, 1320 of metal threads 1301, 1302 woven in three-dimensions in such a way as to form a fibrous structure permitting by itself the preform of the final part to be formed.

In a first embodiment illustrated in FIG. 9, fibrous structure 1300 is a multi-layer structure formed by a first preform 1310 forming the inner side of fibrous structure 1300 and by a second preform 1320 forming the upper side of fibrous structure 1300. Inner side is understood to mean the part of fibrous structure 1300 intended to form the inner part of the metal reinforcement in contact with surface 112 of the blade (FIG. 7) and upper side is understood to mean the part of fibrous structure 1300 which is intended to form the outer part of metal reinforcement 130.

The weaving patterns of fibrous structure 1300 are conventionally weaving patterns used for example in the area of weaving composite fibres, such as for example the weaving patterns described in patent application EP1526285.

In this regard, fibrous structure 1300 comprises a plurality of warp threads 1301 and a plurality of weft threads 1302.

The size of the metal threads, of warp thread 1301 and/or of weft thread 1302 of the fibrous structure, can vary depending on the user's requirements, the rigidity and the required material thickness of metal reinforcement 130.

The metal threads used for weaving fibrous structure 1300 are mainly titanium threads. However, it is possible to incorporate, in the weaving of titanium threads, threads based on silicon carbide and titanium (SiC—Ti), threads coated with boron (SiC-boron), or with silicon carbide (SiC—SiC).

According to another embodiment, fibrous structure 1300 can be formed by a plurality of woven strands acting as "warp thread" and "weft thread". The diameter of the metal strands can vary depending on the user's requirements and the material thickness required for the production of the part. The determination of the diameter of the strand is made based on a compromise between flexibility of the fibrous structure and the material thickness required in the tool. The diameter of the strands and the nature of the ends constituting the latter can also vary, in particular between the strands suitable for forming the warp threads and the strands suitable for forming the weft threads. The metal strands are formed from a plurality of metal ends twisted, woven or wound into a helix about the longitudinal axis of the strand. To advantage, each metal end forming the strand has a diameter of less than 0.1 mm. The principle of producing the metal strands is advantageously the principle of producing metal cables woven from twisted metal ends. By way of example, the metal strand comprises between 20 and 30 wound ends. The use of metal strands formed by a plurality of wound metal ends thus makes it possible to produce a flexible and manually deformable strand. By producing the metal strands having a diameter greater than 0.5 mm, and even several millimeters, the metal strands remain sufficiently flexible to permit their handling, their manual deformation.

The metal ends used to produce the strands are mainly titanium-based ends. However, it is possible to incorporate in the weaving ends based on silicon carbide and titanium (SiC—Ti), ends coated with boron (SiC-boron), or with silicon carbide (SiC—SiC).

According to a second embodiment of the invention, fibrous structure 300 is a monolayer structure formed by a single preform.

Second step 1220 of method of production 1200 is a step for incorporating an insert 150 in fibrous structure 1300 as illustrated in FIG. 5.

When fibrous structure 1300 is formed by two independent preforms 1310, 1320, insert 150 is positioned between the two preforms forming two weaving layers. In this case, it may be necessary during second step 1220 to assemble independent preforms 1310, 1320 in such a way as to keep insert 150 in position.

The assembly of two independent preforms 1310, 1320 can be carried out by threads so as to form a stitched seam between the two independent preforms, by spot welding of different ends of strands or by a specific weaving geometry of one or more preforms, for example to form a local excess thickness capable of forming a stop and keeping the insert in position.

According to another embodiment, the temporary insert can also be hooked on one or more preforms with the aid, for example, of barbs driven into independent preforms 1310, 1320.

Finally, the temporary insert can simply be held in the tool without independent preforms 1310, 1320 being assembled.

When the fibrous structure is formed by a monolayer structure formed by a single preform, the insert can be incorporated by winding the monolayer structure around the insert or by sliding the insert into a cavity previously made by means of a slot provided in the monolayer structure during the weaving step.

Insert 150 is produced in a material different from the material of the metal threads used for the weaving of fibrous structure 1300. Insert 150 is produced in a material capable of resisting a high temperature, of the order of 900° C., a high pressure, of the order of 1000 bar, and which is compatible with the materials of the weaving threads so as not to create impurities or oxidation on fibrous structure 1300.

The material of insert 150 must also be able to be attacked chemically by dissolution by means of a chemical agent.

To advantage, insert 150 is made of copper, or of quartz or silica.

The shape of insert 150 incorporated in fibrous structure 1300 is identical to the shape of final internal cavity 140 illustrated in FIG. 7 and can comprise any kind of profile.

Insert 150 is obtained equally by a forging process, by machining, or by casting.

According to another embodiment, a plurality of inserts 150 are incorporated in the interior of fibrous structure 1300.

Third step 1230 of method of production 1200 is a step for putting in place and shaping fibrous assembly 1500 formed by fibrous structure 1300 and insert 150 in a tool 1400. This step 1230 is illustrated in particular in FIG. 11. Tool 1400 comprises a mould 1410 (bottom die) corresponding to the final external shape of metal reinforcement 130 and a counter-mould 1420 (punching die) corresponding to the final internal shape of the metal reinforcement of the leading edge.

Figure 11:
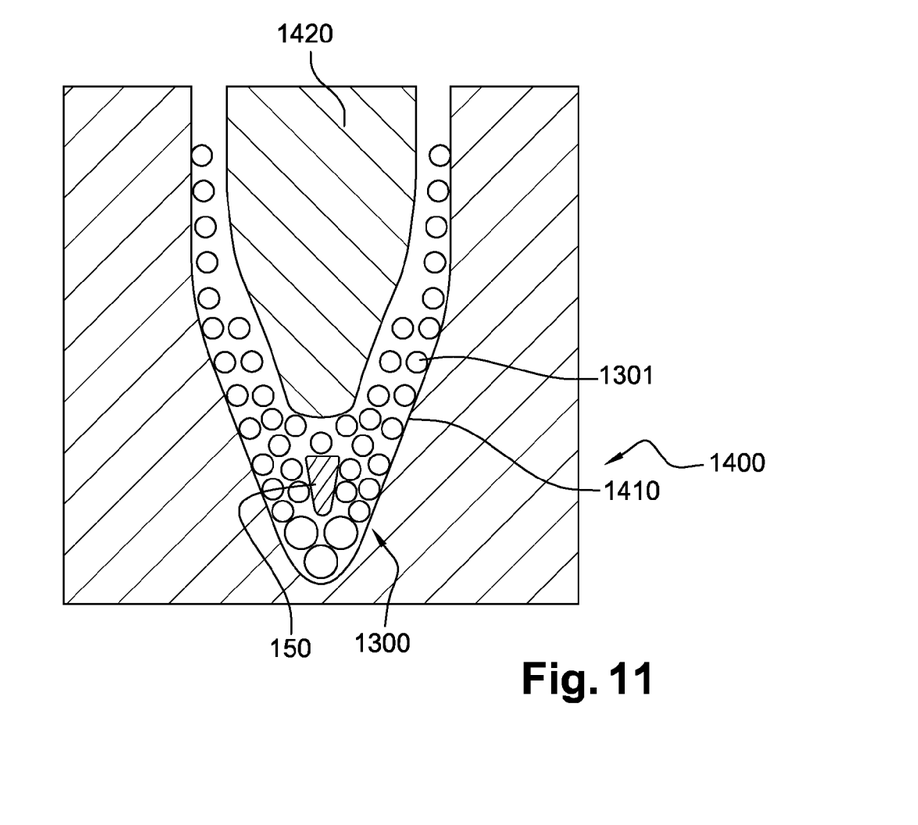
FIG. 11 illustrates a partial view of the hollow metal reinforcement of the leading edge of a turbine engine blade during the third step of the method illustrated in FIG. 8.

Method of production 1200 can comprise, prior to the third step of putting the fibrous assembly into place in the tool, a step 1225 of pre-deformation in a specific tool. This step of pre-deformation of the fibrous assembly may be useful especially when use is made of metal threads of large diameter.

When the weaving of the fibrous structure is carried out by means of flexible strands, pre-deformation step 1225 is not necessary. The use of strands in fact makes it possible to avoid problems of considerable elastic recovery associated with the rigidity of titanium-based threads having a diameter greater than 0.4 mm.

Figure 12:
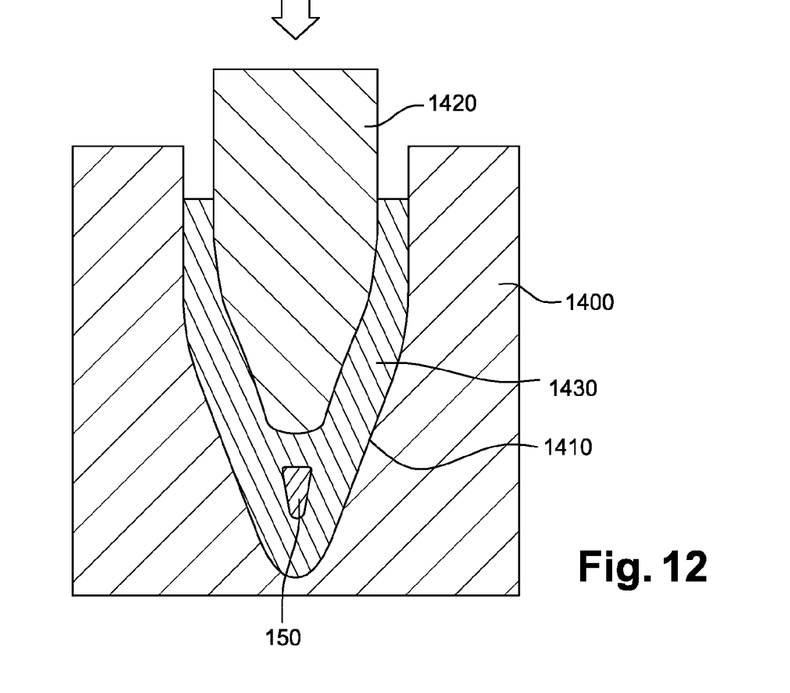
FIG. 12 illustrates a partial view of the hollow metal reinforcement of the leading edge of a turbine engine blade during the fourth step of the method illustrated in FIG. 8.

Fourth step 1240 of method of production 1200 is a step for performing hot isostatic pressing (HIP for Hot Isostatic Pressing in English) of fibrous assembly 1500 in tool 1400, illustrated in FIG. 12, Hot isostatic pressing is a very widely used and known production process for reducing the porosity of metals and influencing the density of numerous metals, such as ceramics. The isostatic pressing process also makes it possible to improve the mechanical properties and usability of materials.

The isostatic pressing is carried out at high temperature (conventionally between 400° C. and 1400° C., and of the order of 1000° C. for titanium) and at isostatic pressure.

Thus, the application of the heat combined with the internal pressure eliminates the hollow spaces in fibrous structure 1300, as well as the microporosities by means of a combination of plastic deformation, plastic flow and diffusion welding in such a way as to form a solid part 1430.

Solid part 1430 resulting from the isostatic pressing step comprises internal and external profiles of metal reinforcement 130. Solid part 1430 is then extracted from tool 1400.

The isostatic pressing step is carried out under vacuum, advantageously under secondary vacuum, either in a welded tool in which the secondary vacuum is produced, or in an autoclave bag, the choice of the process depending on the number of parts to be produced. The secondary vacuum makes it possible to avoid the presence of oxygen in the tool and in the fibrous structure during the step of isostatic pressing of the titanium.

Tool 1400 is produced in a mechanical alloy, a so-called super-alloy or high-performance alloy.

Isostatic pressing step 1240 can include in advance a step 1235 for cleaning, degreasing and/or chemical attack of fibrous assembly 1500 so as to eliminate residual impurities of fibrous structure 1300.

To advantage, the step for cleaning out impurities is carried out by immersion of the fibrous assembly in a bath of cleaning agent or chemical agent.

Figure 13:
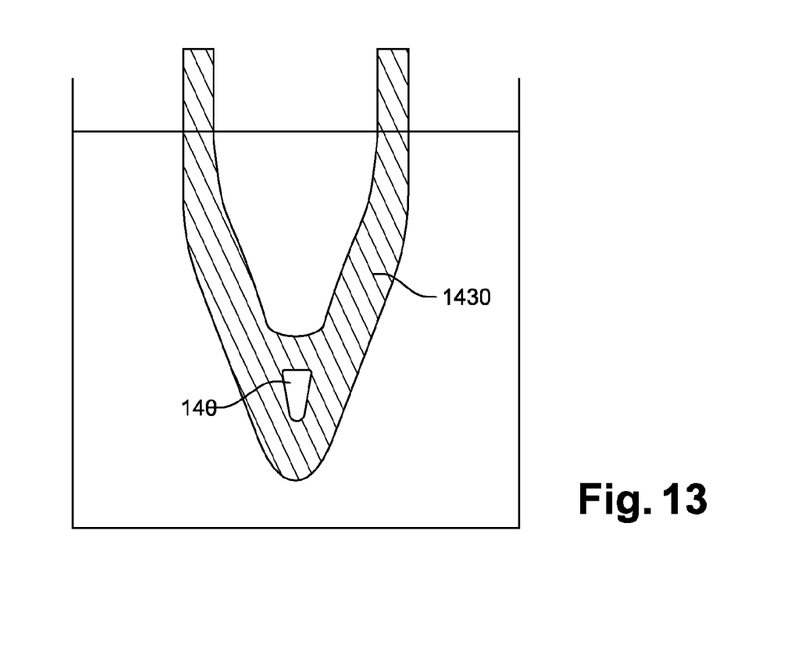
FIG. 13 illustrates a partial view of the hollow metal reinforcement of the leading edge of a turbine engine blade during the fifth step of the method illustrated in FIG. 8.

Fifth step 1250 of method of production 1200 is a step for chemical attack of insert 150 incorporated in the material of solid part 1430 by means of a chemical agent capable of attacking the material in which insert 150 is produced. This step is illustrated in FIG. 13.

The chemical attack of insert 150 makes it possible to dissolve insert 150 in such a way that the space freed by dissolved insert 50 forms internal cavity 140 of metal reinforcement 130 illustrated in FIG. 7.

To advantage, chemical attack step 1250 is carried out by immersion of solid part 1430 in a bath containing chemical agent capable of dissolving insert 150.

The chemical agent is for example an acid or a base.

To advantage, the chemical agent is capable of dissolving copper, quartz or silica.

In association with these main production steps, and whatever the embodiment of the invention, the method according to the invention can also comprise a step for finishing and reworking by machining the solid part obtained at the exit from the tool so as to produce reinforcement 30, 130. This reworking step comprises:
- a step for reworking the profile of base 39, 139 of reinforcement 30, 130 in order to refine the same and in particular the aerodynamic profile of leading edge 31, 131;
- a step for reworking the sides 35, 135, 37, 137; this step consisting in particular in trimming sides 35, 135, 37, 137 and in thinning out the lower-surface and upper-surface sides;
- a finishing step permitting the required surface state to be obtained.

In association with these main production steps, the method according to the invention can also comprise steps for non-destructive control of reinforcement 30, 130 permitting the geometrical and metallurgical compliance of the obtained assembly to be ensured. By way of example, non-destructive controls can be carried out by an x-ray process.

The present invention has been described chiefly with the use of titanium-based metal ends to produce strands; however, the method of production is also applicable with any kind of metal ends.

The method according to the invention makes it possible to produce in a simple manner parts with complex geometries and thicknesses varying essentially between 0.1 and 70 mm. Thus, the method according to the invention makes it possible to produce both solid parts and parts of small thickness.

The invention has been described in particular for the production of a metal reinforcement of a composite turbine engine blade; however, the invention is also applicable to the production of a metal reinforcement of a metal turbine engine blade.

The invention has been described in particular for the production of a metal reinforcement of a leading edge of a turbine engine blade; however, the invention is also applicable to the production of a metal reinforcement of a trailing edge of a turbine engine blade or to the production of a metal reinforcement of a composite or metal propeller.

The other advantages of the invention are in particular the following:
- reduction of production costs;
- reduction of production time;
- simplification of the production range;
- reduction of material costs.

The invention claimed is:

1. A method of production of a solid part, said method comprising:
    - weaving a three-dimensional fibrous structure, said weaving being carried out with metal strands formed by a plurality of metal ends mutually twisted about the longitudinal axis of the strand;
    - performing hot isostatic pressing on said fibrous structure causing the agglomeration of the metal strands of said fibrous structure so as to produce a solid part.

2. The method of production according to claim 1, wherein said weaving is carried out with metal strands formed by a plurality of metal ends, wherein the diameter of each end is less than 0.1 mm.

3. The method of production according to claim 1, wherein said weaving is carried out with metal strands having a diameter equal to or greater than 0.5 mm.

4. The method of production according to claim 1, wherein said weaving is carried out with metal strands having a diameter equal to or greater than 1 mm.

5. The method of production according to claim 1, wherein said weaving is carried out with metal strands formed by a plurality of metal ends of titanium or by a plurality of metal ends of different materials.

6. The method of production according to claim 1 wherein said weaving is carried out with metal strands formed by a plurality of metal ends of different diameters.

7. The method of production according to claim 1, wherein, prior to said hot isostatic pressing, said method comprises shaping said fibrous structure, said shaping being carried out manually.

8. The method of production according to claim 7, wherein said shaping of said fibrous structure is carried out when said fibrous structure is put into place in a tool.

9. The method of production according to claim 1, wherein, prior to said hot isostatic pressing, said method comprises cleaning said fibrous structure.

10. The method of production according to claim 1, wherein said solid part is a metal reinforcement of the leading edge or trailing edge of the fan blade of a turbine engine or propeller.

11. The method of production according to claim 1, wherein said method comprises:
    - weaving at least two three-dimensional fibrous structures, said weaving being carried out with metal strands formed by a plurality of metal ends mutually twisted about the longitudinal axis of the strand;
    - performing hot isostatic pressing on said at least two three-dimensional fibrous structures causing the agglomeration of the metal strands of said fibrous structures so as to produce a solid part.

* * * * *